United States Patent [19]

Gött

[11] Patent Number: 4,995,981

[45] Date of Patent: Feb. 26, 1991

[54] PROCESS FOR ANAEROBICALLY DEGRADING HIGHLY LOADED PROCESS WASTE WATERS

[75] Inventor: Erich Gött, Lahr, Fed. Rep. of Germany

[73] Assignee: Reiflock-Umwelttechnik Margot Reichmann, Baden-Baden, Fed. Rep. of Germany

[21] Appl. No.: 469,169

[22] Filed: Jan. 24, 1990

[30] Foreign Application Priority Data

Feb. 1, 1989 [DE] Fed. Rep. of Germany ....... 3902867

[51] Int. Cl.$^5$ .............................................. C02F 3/28
[52] U.S. Cl. .................................... 210/603; 210/609; 210/622; 210/631; 210/919
[58] Field of Search ............... 210/603, 605, 607, 609, 210/614, 621–626, 629–631, 919, 928

[56] References Cited

U.S. PATENT DOCUMENTS

| | | | |
|---|---|---|---|
| 4,019,952 | 4/1977 | Ploetz et al. | 210/631 |
| 4,213,857 | 7/1980 | Ishida et al. | 210/603 |
| 4,377,486 | 3/1983 | Borrick et al. | 210/609 |
| 4,565,552 | 1/1986 | Cotton | 210/630 |
| 4,780,207 | 10/1988 | Engwirda | 210/631 |
| 4,894,162 | 1/1990 | Cournoyer et al. | 210/631 |

Primary Examiner—Tom Wyse
Attorney, Agent, or Firm—Collard, Roe & Galgano

[57] ABSTRACT

The invention relates to a process for anaerobically degrading highly concentrated process waste waters as obtained particularly in the chemical industry, in paper mills and cellulose plants, fish-processing plants, and in the production and elimination of alcohol or the like, whereby the CSB-content may be up to $10^6$ mg/l or more. This process comprises a putrefactive process which is induced in at least one decomposition tank at about 34° C. by circulating normal sewage sludge, whereby upon start-up of the putrefactive process, a change to chemical process waste waters is carried out without adding communal sewage sludge. Subsequently, the sludge is withdrawn from the decomposition tank, flocculated, and returned to the external circulation for circulating the putrefactive sludge in the decomposition tank.

1 Claim, 1 Drawing Sheet

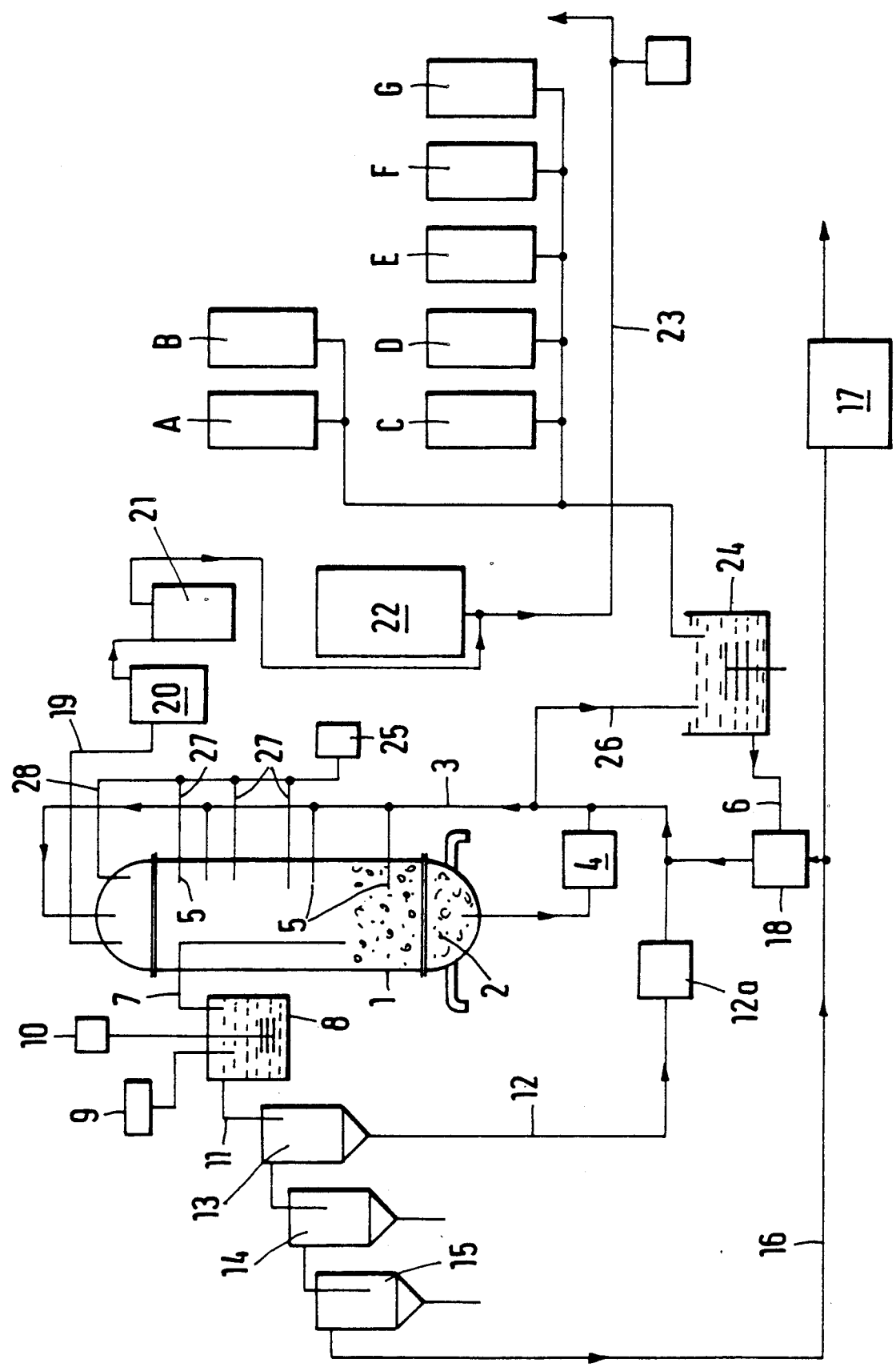

PROCESS FOR ANAEROBICALLY DEGRADING HIGHLY LOADED PROCESS WASTE WATERS

BACKGROUND OF THE INVENTION

1. Field of the Invention

The present invention relates to a process for anaerobically degrading highly concentrated waste waters as obtained, particularly in the chemical industry, in paper mills and cellulose production plants, in fish-processing plants, and in the production and elimination of alcohol or the like, whereby the CSB-content may amount to at least $10^6$ mg/l; and furthermore, the invention provides an apparatus for carrying out the process of the invention.

2. The Prior Art

In communal sewage treatment plants, it is known to subject the sewage sludge to a normal putrefactive process, in which the sewage sludge is fed into a decomposition tank in which such sludge is degraded by various processing procedures and subsequently passed to an after-purification agent.

DE-PS No. 33 35 984 discloses a method for anaerobically purifying chemical industrial waste waters containing organic chemical compounds in the dissolved form with the exception of unsubstituted and halogen-substituted aliphatic hydrocarbons, with sludge being additionally fed into this process. This known process comprises anaerobic degradation together with communal sewage sludge admixed for the purpose of anaerobically degrading chemical industrial waste waters together with communal sewage sludge admixed therewith.

SUMMARY OF THE INVENTION

It is an object of the present invention to provide a process for anaerobically degrading undiluted waste waters having a high concentration of waste by complete putrefaction with the recovery of energy, whereby the independent treatment of process waste waters is to be accomplished without any additional infeed of communal sludge or some other inoculating sludges.

The above object is accomplished in accordance with the present invention by providing a process for anaerobically degrading undiluted waste waters, said process being characterized in that a putrefactive process is initiated in at least one decomposition tank at about 34° C.; that a putrefactive sludge is mixed by continuous circulation with a pump through an external circulation means with withdrawal from the lower zone and inoculation in the top zone of the decomposition tank. Sewage water is simultaneously admitted at different levels of the decomposition tank under oxygen infeed in order to assure constant and thorough mixing of the contents of the decomposition tank. Upon initiation of the putrefactive process without adding communal sewage sludge, a change to chemical process waste waters is carried out in a way such that the process waste waters are separated in individual tanks, analyzed first, premixed from the tanks in a mixing tank to a certain composition depending on the putrefactive process, and continuously passed for about 24 hours into the process of putrefaction in the decomposition tank. Sewage sludge collected in the process is admitted into a flocculating tank connected upstream of the decomposition tank in order to add an exactly metered quantity of a flocculating agent and to thoroughly mix said agent with the sewage sludge by means of a mixer. The flocculated sewage sludge is readmitted to the external circulation for circulating the sewage sludge in the decomposition tank. A displacement takes place within the flocculating tank and sedimentation of the coarsest sludge takes place in a second tank connected downstream, whereupon the cloudy water is passed into a third and, if need be, a fourth tank for settling the portions of sludge still contained therein, whereupon the cloudy water displaced in the last tank is either admitted to a biological stage through a buffer tank or passed into the decomposition tank by a pump; and that the gas generated in the decomposition tank is supplied to a gas tank and subsequently passed purified into a gas tapping or flaring system.

The present invention further provides a process for the anaerobic degradation of highly concentrated chemical process waste waters in which the CBS constant is up to $10^6$ mg/l or greater, comprising inducing putrefication of a putrefactive sludge in at least one decomposition tank zone at about 34° C.; mixing said putrefactive sludge by continuous circulation by withdrawing from the bottom zone of said decomposition tank and adding inoculation sludge in the top zone of the decomposition tank by a sludge pump through a circulation conduit external to said tank; simultaneously admitting putrefactive water at different levels of the decomposition tank in order to assure constant and thorough mixing of the contents of the decomposition tank; feeding oxygen into the decomposition tank in small amounts for preventing $H_2S$ formation; after initially including said putrefaction, stopping the adding of any additional communal sewage sludge; providing a source of chemical process waste waters; separating said chemical process waste waters into individual tank zones, analyzing said chemical process waste waters; passing said waters from said tanks continuously into a mixing tank zone; premixing said chemical process waste waters and said sludge in the mixing tank to a premixed selected composition depending on the putrefactive sludge and waters; passing said premixed composition into said decomposition tank zone; passing said putrefactive sludge downstream from said decomposition tank zone to a flocculating tank zone connected thereto; providing a source of flocculating agent; adding an exactly metered amount of said flocculating agent into said flocculating tank to said sludge and thoroughly mix said agent with said sludge to produce a flocculated putrefactive sludge; recycling said flocculated putrefactive sludge from a second tank zone into the external circulation for recirculating the putrefactive sludge back into the decomposition tank zone; displacing part of the sludge from the flocculating tank zone and causing the settling of the coarse sludge to take place in said second tank zone connected downstream of said flocculating tank zone to produce a cloudy water; feeding said cloudy water into a third or last tank zone for settling the portions of sludge still present; displacing the cloudy water in the last tank and transferring it through a buffer tank to a biological stage or recycling it into the decomposition tank zone; said decomposition tank zone generating a gas and passing said generated gas from said decomposition tank into a gas tank zone; and withdrawing said gas form the process.

The important advantage obtained with the process of the invention is that the primary initiation of the putrefactive process with sewage sludge and the secondary changing of the entire process of putrefaction to using chemical process waste waters permits, in a simple way, an anaerobic degradation of the highly concentrated process waste waters with recovery of energy. This is because according to the process of the invention, it is possible also to putrefy and degrade highly concentrated waste waters. This is especially possible by flocculating the sludge and returning it to the putrefactive process, whereby the process now can be carried out without adding extraneous matter. Furthermore, by combining the waste water charges in the mixer, metered feeding with the circulating sewage sludge is possible during the putrefactive process.

By returning the sludge that has formed on its own back to the circulation zone, which circulation zone builds up additional sludge, it is possible to maintain the putrefactive process, with degradation occuring at a relatively high rate.

The invention, furthermore, relates to a system for the anaerobic degradation of highly concentrated individual chemical process waste waters comprising a decomposition tank having an external circulation conduit connected to a pump for circulating a total putrefactive sludge content; feed conduits connecting said circulation conduit to said decomposition tank and said feed conduits being mounted on said decomposition tank at different levels; a flocculating tank having a supply tank containing a flocculating agent and, having an agitator; a conduit for connecting said flocculating tank downstream from said decomposition tank; a first settling tank connected to a last settling tank and being connected downstream from said flocculating tank; a buffer tank connected to said last settling tank with a conduit and said conduit carrying cloudy water; a first branch line in said conduit carrying the cloudy water, said first branch line being connected with a pump and communicatively connected with the external circulation conduit; a second branch line conduit connecting the first settling tank with the external circulation conduit; a gas conduit connecting the top part of the decomposition tank to a gas holding tank; a gas washing unit connected to said gas holding tank; a gas measuring container connected to said gas washing unit; a gas removal conduit for removing said gas from the system; containers for holding neutralizing agents; a mixer connected to said neutralizing containers at a mixer inlet, and said mixer having an outlet; several containers for receiving and holding said individual process waste waters, said mixer connected with said waste water holding containers at said mixer inlet; said mixer outlet connected to said decomposition tank; a compressor for supplying air or oxygen to said decomposition tank through transmission conduits.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

The drawing has one FIGURE which shows a schematic arrangement of the apparatus for performing the process of the invention.

DETAILED DESCRIPTION OF PREFERRED EMBODIMENT

The apparatus shown in the drawing comprises a decomposition tank 1 with the putrefactive sludge 2 contained therein, and an external circulation conduit 3, by means of which the total sludge content 2 can be circulated by means of the pump 4. The latter withdraws the sludge at the lower funnel tip of the decomposition tank 1 and returns said sludge to the decomposition tank 1 via the top head point. At the same time, the putrefactive sludge can be admitted by means of the feed conduits 5 mounted at different levels of the tank, so that a constant 100% mixing of the contents of the decomposition tank is assured.

After the putrefactive process has been induced and started up, the highly reactive sludge from the chemical waste waters is admitted into the circulation conduit 3 and thus into the decomposition tank 1 from a mixer 24 via a feed conduit 6 by means of a pump 18, which is capable of feeding cloudy water as well, without any addition of normal sewage sludge.

The sludge displaced in the decomposition tank 1 is supplied through a conduit 7 to a flocculating tank 8 connected upstream. The tank 8 is supplied from a supply reservoir 9 with exactly metered quantities of a flocculating agent through a magnetic valve. In the tank 8, an mixer 10 is installed for completely mixing the medium at a low rotary speed, forming a very good sludge flake. The displacement takes place through a conduit 11 into another tank 13 connected downstream, in which the coarsest sludge settles. The cloudy water present is passed into another tank 14, where a minor portion of sludge settles. The same process takes place in tank 15. The displaced cloudy water is subsequently passed through the conduit 16 into a buffer tank 17, from where it is fed to a biological stage. In addition, the cloudy water can be recycled through the pump 18 back into the circulation conduit 3 and hence into the putrefactive process in the decomposition tank 1.

At the top side of the decomposition tank 1, the gas produced in the putrefactive process can be tapped through conduit 19 and passed into a tank 20, from where it is passed to a gas washing unit, or foam trap 21. From there, the gas is fed to a gas measuring container 22, in which the amount of waste water gas obtained daily is exactly measured. The gas is then supplied to a gas generator or flaring device by way of the conduit 23.

The putrefactive process in the decomposition tank 1 is carried out at a controlled temperature of approximately 34° C. No noticeable cooling occurs due to the relatively quick settling and circulating of the sludge mass. The contact period of the sludge is relatively long.

Neutralizing agents are required for carrying out the process of putrefaction. These agents are present in the containers A and B. The neutralizing agents contained in these containers are metered into the process as required, whereby the container A is provided for acid neutralization and the container B is for alkaline neutralization. The tanks C, D, E, F and G, which may be present in any desired number, serve for receiving the individual process waste waters of the chemical industry. Many streams of waste water are currently present in any large plant or chemical factory, which even today still flow together in an uncontrolled manner to some extent, with practically minor biological after-treatment. No knowledge is available in this connection as to what is in fact present in such waste water streams. Samples of the individual streams of waste water are now separated in the tanks C to G, filled up and individually tested depending on the putrefactive process. The test serves the purpose of finding out to what degree degradation is possible, and what is happening with the substance in the putrefactive process in an anaerobic stage.

It has been found that an individual substance that is difficult to degrade biologically in an anaerobic environment is very readily degradable anaerobically in combination with other substances. For this reason, a mixer is connected downstream of the individual tanks C to G, in which the substances are combined, exactly premixed to a certain composition and then fed into the process. Such infeed may take place directly into the mixture via the feed conduit 6. Inoculating sludge can be withdrawn from the circulation conduit 3 by way of the return conduit 26 and returned to the mixer. The degraded product of the various combined substances is continuously withdrawn from the tanks C to G, passed through the mixer 24, and continuously added to the process over a period of 24 hours.

The apparatus, furthermore, has a small compressor 25, by which air or oxygen can be supplied to the anaerobic process. The air or oxygen can be added to the putrefactive sludge in metered quantities either through the conduit 28 from the top or at different levels by way of the conduits 27. This air or oxygen has the function of preventing reduction and the formation of hydrogen sulfide.

The putrefactive sludge is continuously circulated in the decomposition tank 1 by the pump 4 in a cycle comprising eight hours of circulation from the top, eight hours at the level of the uppermost lateral inlet, and eight hours at the level of the lower lateral inlet. In this way, complete circulation is assured with total safety and, at the same time, deposits are prevented from forming in the decomposition tank 1.

It can be noted that the aqueous liquid fed through the pump 18 is already at this point mixed with the process sludge from the mixer 24, passed through the circulation conduit 3 and the decomposition tank 1, where it is displaced, and then flocculated in the tank 8. In the tank 13, the sludge is continuously withdrawn via the conduit 12 by means of the pump 12a, and continuously returned in order to be mixed again into the circulating aqueous liquid. As can be seen, the excess aqueous liquid passes through the conduit 16 to the tank 17 and then onto the biological stage downstream. Sludge preferably should be taken from the process from time to time, which is accomplished from the two tanks 14 and 15.

An advantage of the apparatus of the invention is that the process of the invention, once it has been initiated and built up, develops sludge from its own process waste waters, returns sludge and builds it up again. This process works in an excellent way, being capable also of dealing with relatively high levels of other harmful substances. The CSB-degradation currently comes to about 75 to 80%. The AOX-degradation is on the level of 80 to 85%, with process initiation with 30.9 mg/l. Values of less than 0.1 mg/l were measured at at the outlet. Furthermore, the contact periods can be increased as desired. Contacting is relatively long, so that the process works without problems. Also, it is possible to shut down the process over the weekend or in periods with low waste water levels, and to continue it internally, so that the biomass remains always alive and active.

Furthermore, the process of the invention has the advantage that it is independent of many other properties associated with the normal putrefactive process. Also, it is readily possible according to the process of the invention to detect, or acquire, the amount of waste water obtained in a plant operation, to determine the individual streams of waste water, to test such streams and then to determine a composition that permits perfect functioning of the putrefactive process.

Of course, the individual charge tanks C to G may be dispensed within a large plant, where the aqueous liquid streams of waste water are combined in buffer tanks connected upstream and individually withdrawn from such tanks. The neutralization containers A and B have to be present, whereby the decomposition tank 1 with the gas generation and systems connected downstream is the center, or core apparatus, of the total plant. It is, furthermore, desirable that the plant or apparatus requires various instruments for controlling the process, such instruments being installed at the testing points as required. The important required parameters include the pH-measurement, redox measurement, temperature and conductivity measurements, as well as additionally $O_2$-measurement in the top part of the gas hood of the decomposition tank 1.

While only a single embodiment of the present invention has been shown and described, it is to be understood that many changes and modifications may be made thereunto without departing from the spirit and scope of the invention as defined in the appended claims.

What is claimed is:

1. A process for the anaerobic degradation of highly concentrated chemical process waste waters in which the CBS constant is up to $10^6$ mg/l or greater, comprising the steps of:
   inducing putrefication of a putrefactive sludge in at least one decomposition tank zone at about 34° C;
   mixing said putrefactive sludge by continuous circulation by withdrawing from the bottom zone of said decomposition tank and adding inoculation sludge in the top zone of the decomposition tank by a sludge pump through a circulation conduit external to said tank;
   simultaneously admitting putrefactive water at different levels of the decomposition tank in order to assure constant and thorough mixing of the contents of the decomposition tank;
   feeding oxygen into the decomposition tank in small amounts for preventing $H_2S$ formation;
   after initally including said putrefaction, stopping the adding of any additional communal sewage sludge;
   providing a source of chemical process waste waters;
   separating said chemical process waste waters into individual tank zones, analyzing said chemical process waste waters;
   passing said waters from said tanks continuously into a mixing tank zone;
   premixing said chemical process waste waters and said sludge in the mixing tank to a premixed selected composition depending on the putrefactive sludge and waters;
   passing said premixed composition into said decomposition tank zone;

passing said putrefactive sludge downstream from said decomposition tank zone to a flocculating tank zone connected thereto;

providing a source flocculating agent;

adding an exactly metered amount of said flocculating agent into said flocculating tank to said sludge and thoroughly mix said agent with said sludge to produce a flocculated putrefactive sludge;

recycling said flocculated putrefactive sludge from a second tank zone into the external circulation for recirculating the putrefactive sludge back into the decomposition tank zone;

displacing part of the sludge from the flocculating tank zone and causing the settling of the coarse sludge to take place in said second tank zone connected downstream of said flocculating tank zone to produce a cloudy water;

feeding said cloudy water into a third or last tank zone for settling the portions of sludge still present;

displacing the cloudy water in the last tank and transferring it through a buffer tank to a biological stage or recycling it into the decomposition tank zone;

said decomposition tank zone generating a gas and passing said generated gas from said decomposition tank into a gas tank zone; and withdrawing said gas from the process.

* * * * *